(12) United States Patent
Dai et al.

(10) Patent No.: US 10,021,607 B2
(45) Date of Patent: Jul. 10, 2018

(54) MEASUREMENT CONFIGURATION PROCESSING METHOD AND DEVICE

(71) Applicant: ZTE CORPORATION, Shenzhen, Guangdong Province (CN)

(72) Inventors: Qian Dai, Shenzhen (CN); Jun Yao, Shenzhen (CN); Yunpeng Cui, Shenzhen (CN); He Huang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 152 days.

(21) Appl. No.: 14/909,985

(22) PCT Filed: Apr. 22, 2014

(86) PCT No.: PCT/CN2014/075970
§ 371 (c)(1),
(2) Date: Feb. 3, 2016

(87) PCT Pub. No.: WO2014/177003
PCT Pub. Date: Nov. 6, 2014

(65) Prior Publication Data
US 2016/0192252 A1    Jun. 30, 2016

(30) Foreign Application Priority Data
Aug. 8, 2013 (CN) .......................... 2013 1 0344600

(51) Int. Cl.
*H04W 4/00* (2018.01)
*H04W 36/00* (2009.01)
(Continued)

(52) U.S. Cl.
CPC ... *H04W 36/0094* (2013.01); *H04W 36/0077* (2013.01); *H04W 36/08* (2013.01); *H04W 36/14* (2013.01); *H04W 84/12* (2013.01)

(58) Field of Classification Search
CPC ............ H04W 36/0094; H04W 36/08; H04W 36/0077; H04W 36/14; H04W 84/12
See application file for complete search history.

(56) References Cited

U.S. PATENT DOCUMENTS

| | | | |
|---|---|---|---|
| 2012/0115459 A1* | 5/2012 | Deng | H04W 36/0094 455/422.1 |
| 2013/0170419 A1* | 7/2013 | Bakthavathsalu | H04W 52/0254 370/311 |

(Continued)

FOREIGN PATENT DOCUMENTS

| | | |
|---|---|---|
| CN | 102300288 A | 12/2011 |
| CN | 102612072 A | 7/2012 |

(Continued)

OTHER PUBLICATIONS

Partial Supplementary European Search Report, Application No. 14792102.7, dated Jan. 8, 2016.
(Continued)

Primary Examiner — Kiet Tang
(74) Attorney, Agent, or Firm — Koppel, Patrick, Heybl & Philpott

(57) ABSTRACT

Provided are a method and device for processing measurement configuration. The method includes: after a HO flow or a reselection flow is triggered in a source cell, UE processes a WLAN interworking mechanism measurement configuration in at least one of manners as follows: the UE continues using a current WLAN interworking mechanism measurement configuration; the UE modifies a target frequency point in the current WLAN interworking mechanism measurement configuration into the whole frequency band for measurement; the UE requests for a WLAN interworking mechanism measurement configuration corresponding to a target cell; and the UE suspends WLAN interworking
(Continued)

mechanism measurement until the UE receives the WLAN interworking mechanism measurement configuration corresponding to the target cell.

19 Claims, 4 Drawing Sheets

(51) Int. Cl.
*H04W 36/14* (2009.01)
*H04W 36/08* (2009.01)
*H04W 84/12* (2009.01)

(56) References Cited

U.S. PATENT DOCUMENTS

2014/0199996 A1* 7/2014 Wang .................... H04W 36/14
455/426.1
2014/0204850 A1* 7/2014 Kim ...................... H04L 5/0078
370/329

FOREIGN PATENT DOCUMENTS

| CN | 102884829 A | 1/2013 |
|---|---|---|
| CN | 103209440 A | 7/2013 |
| WO | 2011/121398 | 10/2011 |
| WO | 2013/066679 | 10/2013 |

OTHER PUBLICATIONS

Extended European Search Report, Application No. 14792102.7, dated Jul. 12, 2016.
"Requirements for WLAN/3GPP radio interworking", 3GPP draft; R2-130331 Requirements for WLAN-3GPP Radio Interworking (ETRI), vol. RAN WG2, No. St. Julian, Jan. 28, 2013-Feb. 1, 2013, Jan. 18, 2013, http://www.2gpp.org/ftp/tsg_ran?WG2_RL2/TSGR2_81/Docs/, retrieved on Jan. 18, 2013.
"Considerations on potential challenges for WLAN/3GPP interworking", 3GPP draft; R2-131005 Considerations on Potential Challenges for WLAN & 3GPP Interworking, vol. RAN WG2, No. Chicago, Apr. 15, 2013-Apr. 19, 2013, Apr. 6, 2013, http://www.3gpp.org/ftp/tsg_ran/WG2_RL2/TSGR2_81bis/Docs/, retrieved on Apr. 6, 2013.
"Discussion on Network Selection Solutions", 3GPP draft, Discussion on Network Selection Solutions, vol. RAN WG2, No. Fukuoka, Japan, May 10, 2013, http://www.3gpp.org/ftp/tsg_ran/WG2_RL2/TSGR2_2/Docs/, retrieved on May 10, 2013.

* cited by examiner

MEASUREMENT CONFIGURATION PROCESSING METHOD AND DEVICE

TECHNICAL FIELD

The disclosure relates to the field of communications, and in particular to a method and device for processing measurement configuration.

BACKGROUND

Explosive growth of data services of terminals gradually tensions existing network resources particularly under the condition that network layout of a new-generation communication technology (such as 3rd-Generation (3G) and Long-Term Evolution (LTE)) may not be widely implemented, which consequently causes incapability in meeting requirements of users on rate and traffic and poorer user experiences.

Except a wireless network technology provided by the 3rd Generation Partnership Project (3GPP), a Wireless Local Area Network (WLAN) which has been widely applied at present, particularly an Institute of Electrical and Electronics Engineers 802.11 (IEEE802.11)-standard-based WLAN, has been widely applied to hotspot access coverage in homes, enterprises and even the Internet. A technical specification proposed by the Wireless Fidelity (WIFI) Alliance is most widely applied, so that a WIFI network usually equals to the IEEE802.11-standard-based WLAN in practice, and under the condition of no confusions, a WIFI module is adopted to describe a WLAN supporting wireless transceiver and processing module in a network node hereinafter.

On such a premise, some operating companies and enterprises have proposed to merge a WLAN and an existing 3GPP network to implement joint transmission and fulfil the aims of offloading and improvement of network performance. Although the 3GPP has formulated a related protocol for interworking of the 3GPP network and the WLAN at present, a current interworking architecture also has some shortcomings, and for example, data stream HandOver (HO) is relatively slower when User Equipment (UE) moves between the 3GPP network and the WLAN, and in addition, data streams of both the networks are required to pass through a network element of a 3GPP core network under such a condition, which may cause a heavier load.

3GPP SA2 adopts an Access Network Discovery Support Function (ANDSF) solution, and provides a mode of selecting a target access network for a terminal according to a policy of an operating company. 3GPP R10 defines an ANDSF standard, and an ANDSF implements intelligent network selection as an access anchor point to implement effective offloading of network access through interactive cooperation of a network and the terminal, and is consistent with an operating direction of multi-network cooperation in the future. The ANDSF formulates a policy on the basis of information such as a network load, a terminal capability and a user subscription condition to help a terminal user to select an optimal network system for access and implement cooperation of multiple access manners. The ANDSF may be deployed independently, and may also be combined with other network elements. At present, the mainstream point of the industry is that the ANDSF may be deployed on Program-Controlled Computer (PCC) equipment.

The ANDSF is a core-network-based WLAN interworking solution, and does not consider influence on an access network, and in addition, the ANDSF is a relatively static solution which may not be well adapted to a dynamic variation condition of a network load and channel quality, so that the 3GPP access network group opens up a discussion about WLAN interworking.

There are three basic candidate access network side solutions for WLAN interworking in a related technology.

Solution 1

A 3GPP access network side provides auxiliary information for UE through a system message or dedicated signalling, and the UE determines how to migrate a service to a WLAN or a 3GPP access network according to the auxiliary information and a rule provided by a network element (such as an ANDSF) except an access network. In the solution, a 3GPP access network and WLAN interworking decision-making entity is located in the UE. Wherein, a content of the auxiliary information includes: a WLAN Received Signal Strength Indication (RSSI) threshold, a Basic Service Set (BSS) load threshold, a WLAN Wide Area Network (WAN) metric threshold, an LTE Radio Access Network (RAN) Reference Signal Received Power (RSRP) or Universal Mobile Telecommunication System (UMTS) RAN Received Signal Code Power (RSCP) threshold, a load level of an LTE/UMTS cell and maximum available idle resources of the LTE/UMTS cell.

Solution 2

A 3GPP access network side provides auxiliary information for UE through a system message or dedicated signalling, the auxiliary information including:

a WLAN RSSI threshold, a WLAN BSS load threshold, a WLAN WAN metric threshold, an LTE RAN RSRP or UMTS RAN RSCP threshold, a load level of an LTE/UMTS cell, maximum available idle resources of the LTE/UMTS cell and an indicator of a service type expected for interworking with a WLAN by the network side.

The 3GPP access network side provides access network selection parameters (priorities of a rule provided by a 3GPP RAN and a rule provided by an ANDSF, selection priorities of the WLAN and the 3GPP RAN, a WLAN interworking decision-making rule and the like) for the UE, and the UE determines how to migrate a service to the WLAN or the 3GPP RAN on the basis of these parameters. In the solution, a 3GPP access network and WLAN interworking decision-making entity is divided into: a 3GPP access network and WLAN interworking rule formulation entity and a 3GPP access network and WLAN interworking process triggering entity. Wherein, the 3GPP access network and WLAN interworking rule formulation entity is located on the 3GPP access network side, and the 3GPP access network and WLAN interworking process triggering entity is located on a UE side. The 3GPP access network side is responsible for formulating a 3GPP access network and WLAN interworking rule, and the UE determines when to trigger a 3GPP access network and WLAN interworking process according to a rule of the 3GPP access network side, and then determines a target access network (the 3GPP RAN or the WLAN) and the service to be migrated in combination with own practical WLAN measurement result and the rule of the 3GPP access network side.

Solution 3

For a terminal in a Radio Resource Control (RRC) connection state (LTE system) or a CELL_DCH state (UMTS), a 3GPP access network side determines a manner for the terminal to migrate a service to a WLAN or a 3GPP RAN, and notifies the terminal of the manner. For a terminal in an RRC IDLE (LTE system and UMTS) or CELL_FACH, CELL_PCH or URA_PCH (UMTS) state, the manner in solution 1 or solution 2 is adopted. In the solution, a 3GPP access network and WLAN interworking decision-making entity is located on the 3GPP access network side, and a UE side has a 3GPP access network and WLAN interworking process triggering entity (enabled only when UE is located in the RRC IDLE (LTE system) or CELL_FACH, CELL_PCH or URA_PCH (UTMS system) state).

The network side is required to transmit measurement configuration parameters of a WLAN interworking mechanism to the UE, including: definition about a triggering event which triggers a WLAN interworking measurement report; a candidate measured WLAN list; and WLAN measurements: a Received Channel Power Indicator (RCPI), a Received Signal to Noise Indicator (RSNI), a BSS load and WAN metrics (including uplink and downlink data rates, load, link state and capacity of the WLAN).

The UE performs WLAN measurement according to the measurement configuration, and reports a measurement result to the 3GPP RAN, and the 3GPP RAN makes a decision about how to perform WLAN interworking according to the WLAN measurement result provided by the UE and own load of the 3GPP RAN.

In the solution, only a basic WLAN interworking flow is defined, a measurement configuration of a WLAN interworking mechanism of a source cell is very likely to be different from a measurement configuration of a WLAN interworking mechanism of a target cell during cell HO or cell reselection of the UE, WLAN measurement performed by the UE during HO/reselection is still performed according to the WLAN measurement configuration of the source cell, and the problem whether the generated WLAN measurement report may be utilized by the target cell or not has yet not been clarified in current standard development.

According to an LTE protocol, UE is required to delete a 3GPP RAN measurement configuration of a source cell after cell HO. The inventor discovers that it may not be so good to continue using such a method for a WLAN interworking mechanism because it may cause problems, and for example, considering that a WLAN target frequency point located in an HO area between two adjacent cells is very likely to exist in WLAN interworking measurement configurations of the two adjacent cells at the same time along with denser and denser distribution of WLAN Access Points (APs), a WLAN measurement result obtained by the UE during HO or reselection of the source cell may have a reference significance for the target cell.

For the problem of how to process a measurement configuration during cell HO or cell reselection in the related technology, there is yet no effective solution.

SUMMARY

The embodiment of the disclosure provides a method and device for processing measurement configuration, so as to at least solve the problem of how to process a measurement configuration during cell HO or cell reselection in the related art.

According to one aspect of the embodiments of the disclosure, a method for processing measurement configuration is provided, which may include that: after triggering an HO flow or a reselection flow in a source cell, UE processes a WLAN interworking mechanism measurement configuration in at least one of manners as follows: the UE continues using a current WLAN interworking mechanism measurement configuration; the UE modifies a target frequency point in the current WLAN interworking mechanism measurement configuration into a whole frequency band for measurement; the UE requests for a WLAN interworking mechanism measurement configuration corresponding to a target cell; and the UE suspends WLAN interworking mechanism measurement until the UE receives the WLAN interworking mechanism measurement configuration corresponding to the target cell.

Preferably, the UE may continue using the current WLAN interworking mechanism measurement configuration before receiving the WLAN interworking mechanism measurement configuration corresponding to the target cell.

Preferably, the WLAN interworking mechanism measurement configuration corresponding to the target cell may be sent by an ANDSF, or may be sent by the target cell.

Preferably, under the condition that the UE continues using the current WLAN interworking mechanism measurement configuration, the method may further include that: after HO or reselection of the UE to the target cell, the UE updates the current measurement configuration according to a WLAN interworking mechanism measurement parameters broadcasted in a system message of the target cell.

Preferably, the operation that the UE modifies the target frequency point in the current WLAN interworking mechanism measurement configuration into the whole frequency band for measurement may include that: if the UE does not receive the WLAN interworking mechanism measurement configuration corresponding to the target cell after the UE triggers the HO flow or the reselection flow in the source cell, the UE modifies the target frequency point in the current WLAN interworking mechanism measurement configuration into the whole frequency band for measurement; or, if the UE does not receive the WLAN interworking mechanism measurement configuration corresponding to the target cell after the UE implements the HO flow or the reselection flow, the UE modifies the target frequency point in the current WLAN interworking mechanism measurement configuration into the whole frequency band for measurement.

Preferably, the operation that the UE requests for the WLAN interworking mechanism measurement configuration corresponding to the target cell may include at least one of the following operation that: the UE contains a request in a cell measurement report sent to the source cell to request for the WLAN interworking mechanism measurement configuration corresponding to the target cell; the UE establishes a connection with the target cell to request for the WLAN interworking mechanism measurement configuration corresponding to the target cell after implementing the HO flow or the reselection flow; the UE requests the ANDSF for the WLAN interworking mechanism measurement configuration corresponding to the target cell in a Tracking Area Update (TAU) or Route Area Update (RAU) or Location Area Update (LAU) process; and the UE requests the target cell for the WLAN interworking mechanism measurement configuration corresponding to the target cell in the TAU or RAU or LAU process after implementing the HO flow or the reselection flow.

Preferably, after the operation that the UE contains the request in the cell measurement report sent to the source cell to request for the WLAN interworking mechanism measurement configuration corresponding to the target cell, the method may further include that: the source cell sends the request to the target cell through an HO request message after receiving the request; the source cell receives the WLAN interworking mechanism measurement configuration corresponding to the target cell from the target cell; and the source cell sends the WLAN interworking mechanism measurement configuration corresponding to the target cell to the UE.

Preferably, the source cell receives the WLAN interworking mechanism measurement configuration corresponding to the target cell from the target cell through an HO response message.

Preferably, after the operation that the UE requests the ANDSF or the target cell for the WLAN interworking mechanism measurement configuration corresponding to the target cell in the TAU or RAU or LAU process, the method may further include that: the ANDSF or the target cell sends the WLAN interworking mechanism measurement configuration corresponding to the target cell to the UE after receiving the request of the UE.

Preferably, after the operation that the UE establishes the connection with the target cell to request for the WLAN interworking mechanism measurement configuration corresponding to the target cell after implementing the HO flow or the reselection flow, the method may further include that: the target cell sends the WLAN interworking mechanism measurement configuration corresponding to the target cell to the UE after receiving the request.

Preferably, the operation that the UE establishes the connection with the target cell to request for the WLAN interworking mechanism measurement configuration corresponding to the target cell after implementing the HO flow or the reselection flow may include that: the UE establishes the connection with the target cell, and appends the request in an RRC connection establishment process, or appends the request in uplink dedicated signalling.

Preferably, the ANDSF or the target cell sends the WLAN interworking mechanism measurement configuration corresponding to the target cell to the UE through downlink dedicated signalling.

Preferably, the method may further include that: the UE uses the WLAN interworking mechanism measurement configuration corresponding to the target cell when receiving the WLAN interworking mechanism measurement configuration corresponding to the target cell.

Preferably, the operation that the UE suspends WLAN interworking mechanism measurement until the UE receives the WLAN interworking mechanism measurement configuration corresponding to the target cell may include that: the UE suspends WLAN interworking mechanism measurement until the UE receives the WLAN interworking mechanism measurement configuration corresponding to the target cell after the UE triggers the HO flow or the reselection flow in the source cell; or, the UE suspends WLAN interworking mechanism measurement until the UE receives the WLAN interworking mechanism measurement configuration corresponding to the target cell after the UE implements the HO flow or the reselection flow.

Preferably, the method may further include that: the UE caches the WLAN interworking mechanism measurement configuration corresponding to the source cell, and the UE modifies the target frequency point into the WLAN measurement configuration corresponding to the source cell under the condition that the UE re-establishes a connection with the source cell or is reselected to the source cell if the HO flow or the reselection flow fails, the UE modifying the WLAN interworking mechanism measurement configuration back into the WLAN interworking mechanism measurement configuration corresponding to the source cell.

Preferably, after the HO flow or the reselection flow is triggered in the source cell and before the UE receives the WLAN measurement configuration corresponding to the target cell, under the condition that the UE triggers a WLAN interworking mechanism measurement report, the method may further include at least one of the following steps that: the UE deletes the WLAN interworking mechanism measurement report; and the UE sends the WLAN interworking mechanism measurement report to the target cell.

Preferably, the step that the UE deletes the WLAN interworking mechanism measurement report may include that: the UE deletes the WLAN interworking mechanism measurement report under the condition that the target cell does not support such a WLAN interworking mechanism.

Preferably, the step that the UE sends the WLAN interworking mechanism measurement report to the target cell may include that: the UE sends the WLAN interworking mechanism measurement report to the source cell under the condition that the source cell has yet not sent an HO request to the target cell, and the source cell sends the WLAN interworking mechanism measurement report to the target cell through the HO request message; and the UE establishes the connection with the target cell to send the WLAN interworking mechanism measurement report which is cached before after HO or reselection of the UE to the target cell.

Preferably, after the step that the WLAN interworking mechanism measurement report is sent to the target cell, the method may further include that: the target cell makes a WLAN interworking decision for the UE according to the received WLAN interworking mechanism measurement report; the target cell sends a decision command corresponding to the decision to the source cell through signalling interaction of an HO process, and the source cell sends the decision command to the UE; or, the target cell sends the decision command to the UE through the connection established with the UE.

Preferably, the measurement report contains all or part of parameters of the WLAN measurement configuration corresponding to the measurement report, and all or part of the parameters are used for enabling the cell receiving the measurement report to make the WLAN interworking decision for the UE.

According to another aspect of the embodiment of the disclosure, a device for processing measurement configuration is provided, which may be located in UE, including a measurement configuration processing component, wherein the measurement configuration processing component is configured to, after triggering an HO flow or a reselection flow in a source cell, process a WLAN interworking mechanism measurement configuration in at least one of manners of: continuing using a current WLAN interworking mechanism measurement configuration; modifying a target frequency point in the current WLAN interworking mechanism measurement configuration into the whole frequency band for measurement; requesting for a WLAN interworking mechanism measurement configuration corresponding to a target cell; and suspending WLAN interworking mechanism measurement until the UE receives the WLAN interworking mechanism measurement configuration corresponding to the target cell.

According to another aspect of the embodiment of the disclosure, a method for processing measurement configuration is provided, which may include that: a request sent by UE is received, wherein the request may be configured to request for a WLAN interworking mechanism measurement configuration corresponding to a target cell, and the target cell may be a target cell of an HO flow or reselection flow triggered by the UE; and the WLAN interworking mechanism measurement configuration corresponding to the target cell is sent to the UE.

Preferably, the step that the request sent by the UE is received may include at least one of the following steps that:

a source cell receives a cell measurement report sent by the UE, wherein the cell measurement report contains the request; the target cell receives the request through a connection established with the UE after the UE implements the HO flow or the reselection flow; an ANDSF receives the request in a TAU or RAU or LAU process; and the target cell receives the request in the TAU or RAU or LAU process after the UE implements the HO flow or the reselection flow.

Preferably, after the step that the source cell receives the cell measurement report sent by the UE, the method may further include that: the source cell sends the request to the target cell through an HO request message; the source cell receives the WLAN interworking mechanism measurement configuration corresponding to the target cell from the target cell; and the source cell sends the WLAN interworking mechanism measurement configuration corresponding to the target cell to the UE.

Preferably, the source cell receives the WLAN interworking mechanism measurement configuration corresponding to the target cell from the target cell through an HO response message.

Preferably, after the step that the ANDSF or the target cell receives the request in the TAU or RAU or LAU process, the method may further include that: the ANDSF or the target cell sends the WLAN interworking mechanism measurement configuration corresponding to the target cell to the UE.

Preferably, after the step that the target cell receives the request through the connection established with the UE, the method may further include that: the target cell sends the WLAN interworking mechanism measurement configuration corresponding to the target cell to the UE.

Preferably, the ANDSF or the target cell sends the WLAN interworking mechanism measurement configuration corresponding to the target cell to the UE through downlink dedicated signalling.

Preferably, the method may further include that: the target cell receives a WLAN interworking mechanism measurement report sent by the UE, wherein sending of the WLAN interworking mechanism measurement report is triggered by the UE after the HO flow or the reselection flow is triggered in the source cell and before the UE receives the WLAN measurement configuration corresponding to the target cell.

Preferably, the step that the target cell receives the WLAN interworking mechanism measurement report sent by the UE may include at least one of the following steps that: the target cell receives the HO request message sent by the source cell, wherein the HO request message contains the WLAN interworking mechanism measurement report, and the WLAN interworking mechanism measurement report of the source cell is received from the UE; and the target cell receives the WLAN interworking mechanism measurement report which is cached by the UE before through the connection established with the UE after HO or reselection of the UE to the target cell.

Preferably, after the step that the target cell receives the WLAN interworking mechanism measurement report sent by the UE, the method may further include that: the target cell makes a WLAN interworking decision for the UE according to the received WLAN interworking mechanism measurement report; the target cell sends a decision command corresponding to the decision to the source cell through signalling interaction of an HO process, and the source cell sends the decision command to the UE; or, the target cell sends the decision command to the UE through the connection established with the UE.

Preferably, the measurement report contains all or part of parameters of the WLAN measurement configuration corresponding to the measurement report, and all or part of the parameters are used for enabling the cell receiving the measurement report to make the WLAN interworking decision for the UE.

According to another aspect of the embodiment of the disclosure, a device for processing measurement configuration is further provided, which may include: a receiving component, configured to receive a request sent by UE, wherein the request may be configured to request for a WLAN interworking mechanism measurement configuration corresponding to a target cell, and the target cell may be a target cell of an HO flow or reselection flow triggered by the UE; and a sending component, configured to send the WLAN interworking mechanism measurement configuration corresponding to the target cell to the UE.

According to the embodiment of the disclosure, after the HO flow or the reselection flow is triggered in the source cell, the UE processes the WLAN interworking mechanism measurement configuration in at least one of the abovementioned processing manners, so that the problem of how to process a measurement configuration during cell HO or cell reselection in the related technology is solved, and the measurement configuration for cell HO or reselection may be processed better.

BRIEF DESCRIPTION OF THE DRAWINGS

The drawings described here are adopted to provide further understanding of the embodiment of the disclosure, and form a part of the disclosure. Schematic embodiments of the disclosure and description thereof are adopted to explain the disclosure and not intended to form improper limits to the disclosure. In the drawings.

DETAILED DESCRIPTION OF THE EMBODIMENTS

It is important to note that the embodiments in the disclosure and characteristics in the embodiments can be combined under the condition of no conflicts. The disclosure will be described below with reference to the drawings and the embodiments in detail.

Figure 1:
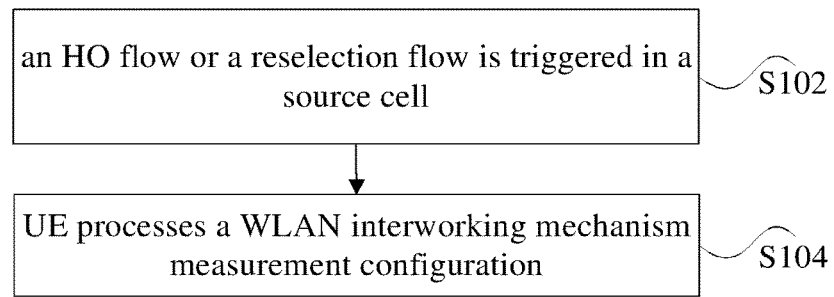
FIG. 1 is a flowchart of a method for processing measurement configuration according to an embodiment of the disclosure.

The embodiment provides a method for processing measurement configuration. FIG. 1 is a flowchart of a method for processing measurement configuration according to an embodiment of the disclosure, and as shown in FIG. 1, the method includes the following steps:

step 102: an HO flow or a reselection flow is triggered in a source cell; and step 104: after the HO flow or the reselection flow is triggered in the source cell, UE processes a WLAN interworking mechanism measurement configuration in at least one of manners as follows: manner 1, the UE continues using a current WLAN interworking mechanism measurement configuration; manner 2, the UE modifies a target frequency point in the current WLAN interworking mechanism measurement configuration into the whole frequency band for measurement; manner 3, the UE requests for a WLAN interworking mechanism measurement configuration corresponding to a target cell; and manner 4, the UE suspends WLAN interworking mechanism measurement until the UE receives the WLAN interworking mechanism measurement configuration corresponding to the target cell.

By the above steps, the problem of how to process the measurement configuration during cell HO or cell reselection in the related art is solved, and the measurement configuration for cell HO or reselection is processed better. The abovementioned four manners may be used independently, and may also be combined for use. Preferred implementation modes of the four manners are described below.

In manner 1, the current WLAN interworking mechanism measurement configuration may be continuously used, and preferably, the current WLAN interworking mechanism measurement configuration may be continuously used before the WLAN interworking mechanism measurement configuration corresponding to the target cell is received. Preferably, the WLAN interworking mechanism measurement configuration corresponding to the target cell may be sent by an ANDSF, and may also be sent by the target cell.

Preferably, under the condition that the UE continues using the current WLAN interworking mechanism measurement configuration, the method further includes that: after HO or reselection of the UE to the target cell, the UE updates the current measurement configuration according to measurement parameters of the WLAN interworking mechanism contained in a system broadcast message of the target cell.

In manner 2, there are two preferred implementations. First, if the UE does not receive the WLAN interworking mechanism measurement configuration corresponding to the target cell after the UE triggers the HO flow or the reselection flow in the source cell, the UE may modify the target frequency point in the current WLAN interworking mechanism measurement configuration into the whole frequency band for measurement; and second, if the UE does not receive the WLAN interworking mechanism measurement configuration corresponding to the target cell after the UE implements the HO flow or the reselection flow, the UE may modify the target frequency point in the current WLAN interworking mechanism measurement configuration into the whole frequency band for measurement.

Preferably, after the HO flow or the reselection flow fails, the UE modifies the target frequency point into a WLAN measurement configuration corresponding to the source cell.

In manner 3, requesting, by the UE, for the WLAN interworking mechanism measurement configuration corresponding to the target cell may include at least one of the followings: the UE contains a request in a cell measurement report sent to the source cell to request for the WLAN interworking mechanism measurement configuration corresponding to the target cell; the UE establishes a connection with the target cell to request for the WLAN interworking mechanism measurement configuration corresponding to the target cell after implementing the HO flow or the reselection flow (the request may be appended in an RRC connection establishment process, or the request may also be appended in uplink dedicated signalling); the UE requests the ANDSF for the WLAN interworking mechanism measurement configuration corresponding to the target cell in a TAU or RAU or LAU process; and the UE requests the target cell for the WLAN interworking mechanism measurement configuration corresponding to the target cell in the TAU or RAU or LAU process after implementing the HO flow or the reselection flow.

Operation executed on a network side after the UE requests for the WLAN interworking mechanism measurement configuration corresponding to the target cell is described below with some examples, and the following examples are preferred examples.

Example 1: the UE contains the request in the cell measurement report sent to the source cell to request for the WLAN interworking mechanism measurement configuration corresponding to the target cell, and the source cell sends the request to the target cell through an HO request message after receiving the request; the source cell receives the WLAN interworking mechanism measurement configuration corresponding to the target cell from the target cell; and the source cell sends the WLAN interworking mechanism measurement configuration corresponding to the target cell to the UE.

Preferably, the source cell receives the WLAN interworking mechanism measurement configuration corresponding to the target cell from the target cell through an HO response message.

Example 2: after the UE requests for the ANDSF or the target cell for the WLAN interworking mechanism measurement configuration corresponding to the target cell in the TAU or RAU or LAU process, the ANDSF or the target cell sends the WLAN interworking mechanism measurement configuration corresponding to the target cell to the UE after receiving the request of the UE.

Example 3: after the UE establishes the connection with the target cell to request for the WLAN interworking mechanism measurement configuration corresponding to the target cell after implementing the HO flow or the reselection flow, the target cell sends the WLAN interworking mechanism measurement configuration corresponding to the target cell to the UE after receiving the request.

In the abovementioned three examples, the ANDSF or the target cell sends the WLAN interworking mechanism measurement configuration corresponding to the target cell to the UE through downlink dedicated signalling.

Corresponding to the operation on the network side, the embodiment further provides another method for processing measurement configuration, which includes that: a request sent by UE is received, wherein the request is used for requesting for a WLAN interworking mechanism measurement configuration corresponding to a target cell, and the target cell is a target cell of an HO flow or reselection flow triggered by the UE; and the WLAN interworking mechanism measurement configuration corresponding to the target cell is sent to the UE.

Preferably, the step that the request sent by the UE is received includes at least one of the followings: a source cell receives a cell measurement report sent by the UE, wherein the cell measurement report contains the request; the target cell receives the request through a connection established with the UE after the UE implements the HO flow or the reselection flow; an ANDSF receives the request in a TAU or RAU or LAU process; and the target cell receives the request in the TAU or RAU or LAU process after the UE implements the HO flow or the reselection flow.

Preferably, after the source cell receives the cell measurement report sent by the UE, the method may further include that: the source cell sends the request to the target cell through an HO request message; the source cell receives the WLAN interworking mechanism measurement configuration corresponding to the target cell from the target cell; and the source cell sends the WLAN interworking mechanism measurement configuration corresponding to the target cell to the UE.

Preferably, the source cell receives the WLAN interworking mechanism measurement configuration corresponding to the target cell from the target cell through an HO response message.

Preferably, after the ANDSF or the target cell receives the request in the TAU or RAU or LAU process, the method may further include that: the ANDSF or the target cell sends the WLAN interworking mechanism measurement configuration corresponding to the target cell to the UE.

Preferably, after the target cell receives the request through the connection established with the UE, the method may further include that: the target cell sends the WLAN interworking mechanism measurement configuration corresponding to the target cell to the UE.

Preferably, the ANDSF or the target cell sends the WLAN interworking mechanism measurement configuration corresponding to the target cell to the UE through downlink dedicated signalling.

Preferably, the method may further include that: the target cell receives a WLAN interworking mechanism measurement report sent by the UE, wherein sending of the WLAN interworking mechanism measurement report is triggered by the UE after the HO flow or the reselection flow is triggered in the source cell and before the UE receives the WLAN measurement configuration corresponding to the target cell.

Preferably, the target cell receiving the WLAN interworking mechanism measurement report sent by the UE may include at least one of the followings: the target cell receives the HO request message sent by the source cell, wherein the HO request message contains the WLAN interworking mechanism measurement report, and the WLAN interworking mechanism measurement report of the source cell is received from the UE; and the target cell receives the WLAN interworking mechanism measurement report which is cached by the UE before through the connection established with the UE after HO or reselection of the UE to the target cell.

Preferably, after the target cell receives the WLAN interworking mechanism measurement report sent by the UE, the method may further include that: the target cell makes a WLAN interworking decision for the UE according to the received WLAN interworking mechanism measurement report; the target cell sends a decision command corresponding to the decision to the source cell through signalling interaction of an HO process, and the source cell sends the decision command to the UE; or, the target cell sends the decision command to the UE through the connection established with the UE.

Preferably, the measurement report contains all or part of parameters of the WLAN measurement configuration corresponding to the measurement report, and all or part of the parameters are used for enabling the cell receiving the measurement report to make the WLAN interworking decision for the UE.

The embodiment further provides a device for processing measurement configuration, which may be located in equipment on the network side. The device includes: a receiving component and a sending component, wherein the receiving component is configured to receive a request sent by UE, wherein the request is used for requesting for a WLAN interworking mechanism measurement configuration corresponding to a target cell, and the target cell is a target cell of an HO flow or reselection flow triggered by the UE; and the sending component is coupled to the receiving component, and is configured to send the WLAN interworking mechanism measurement configuration corresponding to the target cell to the UE.

Preferably, the UE uses the WLAN interworking mechanism measurement configuration corresponding to the target cell if receiving the WLAN interworking mechanism measurement configuration corresponding to the target cell.

In manners 2, 3 and 4, the UE caches the WLAN interworking mechanism measurement configuration corresponding to the source cell, and the if the HO flow or the reselection flow fails, the UE modifies the WLAN interworking mechanism measurement configuration back into the WLAN interworking mechanism measurement configuration corresponding to the source cell under the condition that the UE re-establishes a connection with the source cell or is reselected back into the source cell.

In manner 4, the UE preferably suspends WLAN interworking mechanism measurement until the UE receives the WLAN interworking mechanism measurement configuration corresponding to the target cell after the UE triggers the HO flow or the reselection flow in the source cell; or, the UE suspends WLAN interworking mechanism measurement until the UE receives the WLAN interworking mechanism measurement configuration corresponding to the target cell after the UE implements the HO flow or the reselection flow.

For manner 4, after the HO flow or the reselection flow is triggered in the source cell and before the UE receives the WLAN measurement configuration corresponding to the target cell, under the condition that the UE triggers a WLAN interworking mechanism measurement report, as a preferred implementation, at least one of the following processing may further be performed: the UE deletes the WLAN interworking mechanism measurement report (for example, the UE may delete the WLAN interworking mechanism measurement report under the condition that the target cell does not support such a WLAN interworking mechanism); and the UE sends the WLAN interworking mechanism measurement report to the target cell.

Preferably, the processing that the UE sends the measurement report to the target cell may include that: the UE sends the measurement report to the source cell under the condition that the source cell has yet not sent an HO request to the target cell, and the source cell sends the WLAN interworking mechanism measurement report to the target cell through the HO request message; and the UE establishes the connection with the target cell to send the measurement report which is cached before after HO or reselection of the UE to the target cell.

Preferably, the target cell makes a WLAN interworking decision for the UE according to the received WLAN interworking mechanism measurement report; the target cell sends a decision command corresponding to the decision to the source cell through signalling interaction of an HO process, and the source cell sends the decision command to the UE; or, the target cell sends the decision command to the UE through the connection established with the UE.

Preferably, the measurement report contains all or part of the parameters of the WLAN measurement configuration corresponding to the measurement report, and all or part of the parameters are used for enabling the cell receiving the measurement report to make the WLAN interworking decision for the UE.

The embodiment further provides a device for processing measurement configuration, which is located in UE. The device includes a measurement configuration processing component, the measurement configuration processing component may implement the abovementioned method and preferred method embodiments, and for example, the measurement configuration processing component is configured to, after triggering an HO flow or a reselection flow in a source cell, process a WLAN interworking mechanism measurement configuration in at least one of manners of: continuing using a current WLAN interworking mechanism measurement configuration; modifying a target frequency point in the current WLAN interworking mechanism measurement configuration into the whole frequency band for measurement; requesting for a WLAN interworking mechanism measurement configuration corresponding to a target cell; and suspending WLAN interworking mechanism measurement until the UE receives the WLAN interworking mechanism measurement configuration corresponding to the target cell.

A function of the measurement configuration processing component may further be implemented in a processor.

Description will be given below with reference to preferred embodiments.

A method for managing a WLAN interworking measurement configuration in a cell HO or cell reselection process of a terminal is disclosed in the following preferred embodiments, so as to solve a problem, which is probably caused by a difference between WLAN interworking measurement configurations of a source cell and a target cell, about effectiveness of a WLAN measurement report of UE.

In the following preferred embodiments, when the UE triggers an HO flow or a reselection flow in the source cell, the UE manages the WLAN interworking mechanism measurement configuration (called a WLAN measurement configuration hereinafter) in one of the following methods:

a): (on the terminal side) if the UE triggers the HO flow or the reselection flow in the source cell, the UE determines that own WLAN interworking mechanism measurement configuration is still effective as a default before the UE receives the WLAN interworking mechanism measurement configuration corresponding to the target cell, and continues using the current WLAN interworking mechanism measurement configuration to execute WLAN interworking mechanism measurement or report a WLAN interworking mechanism measurement report.

Preferably, the WLAN measurement configuration corresponding to the target cell may be sent to the UE by a target Evolved Node B/Radio Network Controller (eNB/RNC) or an ANDSF.

Preferably, if parameters related to WLAN measurement are broadcasted in a system message of the target cell after HO or reselection of the UE to the target cell, the UE updates corresponding parameters in own current WLAN measurement configuration according to the parameters related to WLAN measurement in the system message.

b): (on the terminal side) when the UE triggers the HO flow or the reselection flow in the source cell, or after the UE implements HO/reselection, the UE modifies a target frequency point in the current WLAN interworking mechanism measurement configuration into the whole frequency band for measurement before receiving the WLAN measurement configuration corresponding to the target cell.

Preferably, if HO/reselection fails, the UE returns to the source cell, and then the UE modifies the target frequency point of the WLAN measurement configuration into the WLAN measurement configuration corresponding to the source cell.

c): (on the terminal side) after the UE triggers the HO flow or the reselection flow in a source network, or the UE implements HO/reselection, the UE requests the target cell (eNB/RNC) or the ANDSF for the WLAN measurement configuration corresponding to the target cell.

Preferably, the UE may appends such a request in an A3 measurement report sent to the source cell, and the source cell sends the request to the target cell through an HO request message; or the UE initiates a connection with a network side to send the request in the target cell after implementing HO/reselection, or the UE appends the request to send the request to the source cell or the ANDSF in a TAU or RAU process.

d): (on the terminal side) after the UE triggers the HO flow or the reselection flow in the source network, or the UE implements HO/reselection, the UE stops or delays WLAN measurement until the UE receives the WLAN measurement configuration corresponding to the target cell.

Preferably, in c and d, if HO/reselection fails, the UE returns to the source cell, and then the UE uses the WLAN measurement configuration of the source cell to execute WLAN measurement.

Preferably, in a, b, c and d, when the UE triggers the HO flow or the reselection flow in the source cell and before the UE receives the WLAN measurement configuration corresponding to the target cell, if the UE triggers a WLAN interworking mechanism measurement report, one of the following methods is adopted:

A: the UE deletes the measurement report;

B: if the target cell does not support such a WLAN interworking mechanism, the UE deletes the measurement report;

C: the UE sends the measurement report to the target cell, and preferably, a sending method may include:

Method 1: if the source cell has yet not sent an HO request to the target cell, the UE sends the measurement report to the source cell, and the source cell sends the measurement report to the target cell through an HO request message; or Method 2: the UE establishes a connection with the target cell and sends the measurement report after HO or reselection of the UE to the target cell, and if the UE has yet not implemented an HO or reselection process, the UE caches the measurement report.

According to C, the UE preferably appends all or part of parameters of the WLAN measurement configuration corresponding to the report in the measurement report to help a serving cell to judge whether the measurement report may be adopted for making a WLAN interworking decision for the UE or not.

Description will be given below with reference to some embodiments.

Embodiment 1: Corresponding to a)

An application scenario of the embodiment includes an LTE system and a UMTS.

A source cell and a target cell may be eNBs of the LTE system or RNCs or Node Bs of the UMTS. The source cell and the target cell both support a WLAN interworking mechanism.

Figure 2:
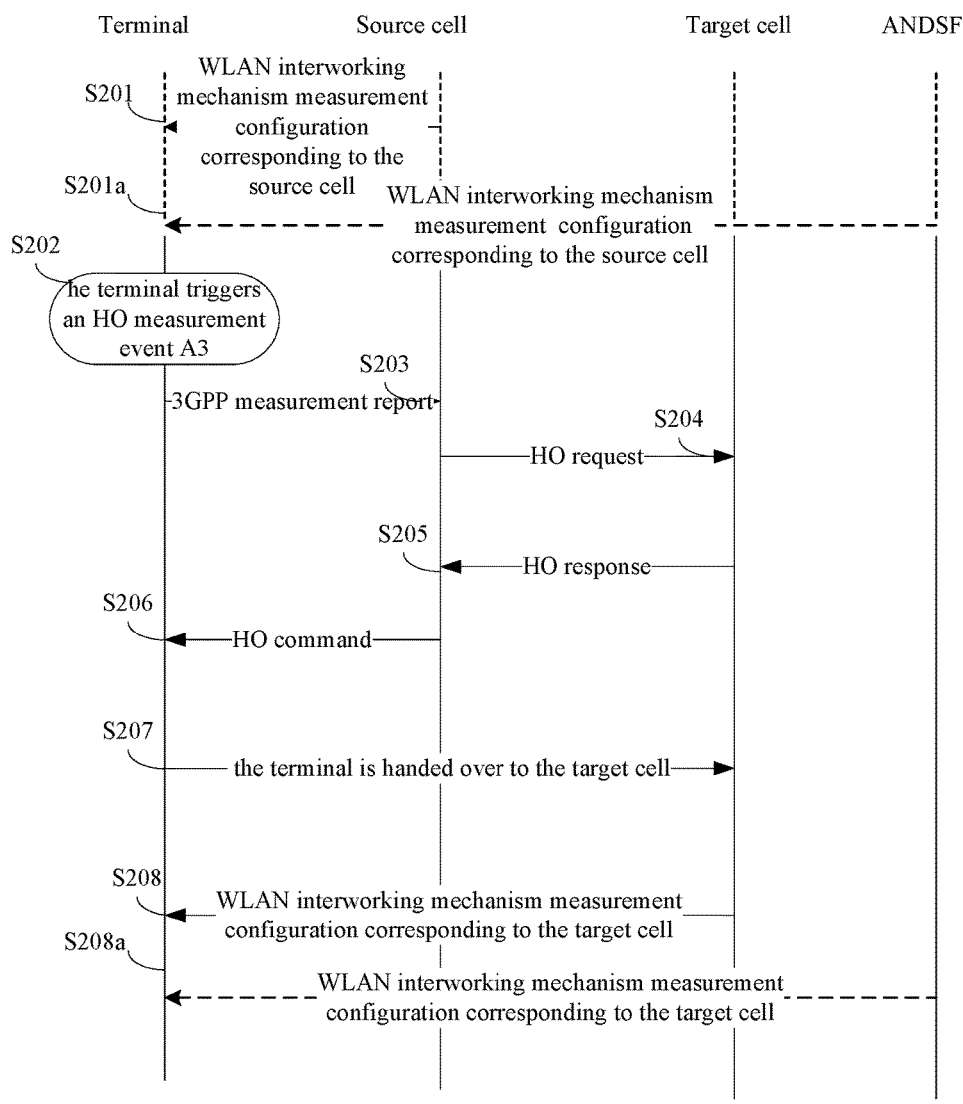
FIG. 2 is a flowchart of preferred embodiment 1 in a cell HO scenario according to the disclosure.

A cell HO scenario:

FIG. 2 is a flowchart of preferred embodiment 1 in a cell HO scenario according to of the disclosure, and as shown in FIG. 2, the flow includes the following steps:

step 201: UE executes WLAN measurement in the source cell according to a WLAN interworking mechanism measurement configuration corresponding to the source cell, the WLAN interworking mechanism measurement configuration corresponding to the source cell being sent to the UE through the source cell Node B (if solution 3 in a background technology is adopted); or Step 201a: the UE executes WLAN measurement in the source cell according to the WLAN interworking mechanism measurement configuration corresponding to the source cell, the WLAN interworking mechanism measurement configuration corresponding to the source cell being sent to the UE through an ANDSF (if solution 1 or 2 in the background technology is adopted), or being configured for the UE by an operating company through an operation and maintenance background, or being preconfigured for the UE by the operating company during subscription.

Step 202: when the UE triggers an HO flow in the source cell and before the UE receives a WLAN interworking mechanism measurement configuration corresponding to the target cell (before Step 208 or Step 208a), the UE continues executing WLAN measurement according to own current WLAN interworking mechanism measurement configuration. Step 203 to Step 207 show the HO step: a 3GPP measurement report is sent in Step 203, the source cell sends an HO request in Step 204, the target cell sends an HO response in Step 205, the source cell sends an HO command to the terminal (i.e. the UE) in Step 206, and the terminal is handed over to the target cell in Step 207.

Preferably, in the process, after the UE implements the HO flow and is handed over to the target cell, the UE updates the corresponding parameter in own current WLAN measurement configuration by virtue of an auxiliary parameter related to WLAN measurement; and preferably, the auxiliary parameter related to WLAN measurement may be sent to the terminal by the target cell through a system message or dedicated signalling.

The auxiliary parameters related to WLAN interworking mechanism measurement may refer to description in the background art, and if the system adopts solution 1 in the background art, an indicator about a service type expected for interworking with a WLAN by the network side is also included except the auxiliary parameter in solution 1.

Preferably, when the UE receives the WLAN interworking mechanism measurement configuration corresponding to the target cell, the UE performs WLAN measurement according to the WLAN measurement configuration corresponding to the target cell. The WLAN measurement configuration corresponding to the target cell may be sent to the UE by the target cell Node B (the eNB in the LTE system or the RNC or the UMTS) or the ANDSF.

Figure 3:
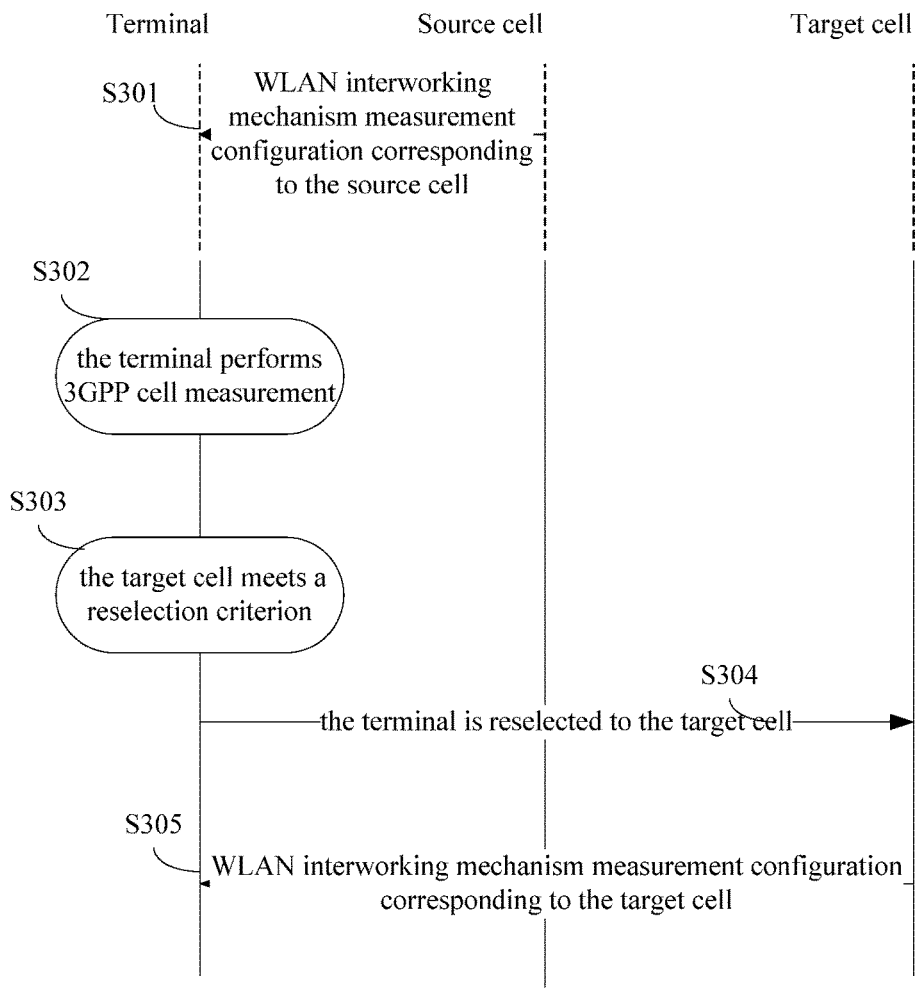
FIG. 3 is a flowchart of preferred embodiment 1 in a cell reselection scenario according to the disclosure.

A cell reselection scenario:

FIG. 3 is a flowchart of preferred embodiment 1 in a cell reselection scenario according to the disclosure. Similar to that of the cell HO scenario, the flow, as shown in FIG. 3, includes the following steps:

step 301: the terminal executes WLAN measurement according to the WLAN interworking mechanism measurement configuration corresponding to the source cell at first;

step 302: the terminal executes signal quality measurement on 3GPP cells (i.e. the source cell and a neighbouring cell) at the same time;

step 303: when measurement results, obtained by the terminal, of the 3GPP cells meet a cell reselection criterion, UE continues executing WLAN measurement according to own current WLAN interworking mechanism measurement configuration before the UE receives the WLAN interworking mechanism measurement configuration corresponding to the target cell;

step 304: the terminal is reselected to the target cell; and step 305: the WLAN interworking mechanism measurement configuration corresponding to the target cell is received.

After the UE receives the WLAN interworking mechanism measurement configuration corresponding to the target cell, the UE performs WLAN measurement according to the WLAN measurement configuration corresponding to the target cell. The WLAN measurement configuration corresponding to the target cell may be sent to the UE by the target cell Node B (the eNB of the LTE system or the RNC of the UMTS) or the ANDSF.

Preferably, when the UE triggers the HO flow or the reselection flow in the source cell, or after the UE implements cell HO or reselection and before the UE receives the WLAN measurement configuration corresponding to the target cell, if the UE triggers a WLAN interworking mechanism measurement report, the measurement report is processed by one of methods as follows:

the UE deletes the measurement report, whether the target cell supports such a WLAN interworking mechanism or not may preferably be judged, and if the target cell does not support the WLAN interworking mechanism, the UE deletes the measurement report.

the UE sends the measurement report to the target cell, specifically including that: if the source has yet not sent an HO request to the target cell, the UE sends the measurement report to the source cell, and the source cell sends the measurement report to the target cell through an HO request message; or the UE establishes a connection with the target cell and sends the measurement report after HO or reselection of the UE to the target cell; and if the UE has yet not implemented an HO or reselection process, the UE caches the measurement report.

Preferably, the measurement report is obtained by the UE according to the WLAN measurement configuration corresponding to the source cell, part of measurement configuration parameters may be different from WLAN measurement configuration parameters of the target cell, so that the UE appends all or part of parameters of the adopted WLAN measurement configuration in the measurement report to help the target cell to determine whether the measurement report may be adopted to make a WLAN interworking decision for the UE or not to help the target cell to utilize the measurement report.

The solution of the embodiment has the advantages that: WLAN measurement executed by the UE on the basis of the WLAN measurement configuration of the source cell and the generated WLAN interworking mechanism measurement report are helpful for WLAN interworking of the UE in the target cell and favourable for improving a user experience and accelerating the WLAN interworking decision of the UE in the target cell.

Embodiment 2: Corresponding to b)

An application scenario of the embodiment includes an LTE system and a U MTS.

A source cell and a target cell may be eNBs of the LTE system or RNCs or Node Bs of the UMTS. The source cell and the target cell both support a WLAN interworking mechanism.

Figure 4:
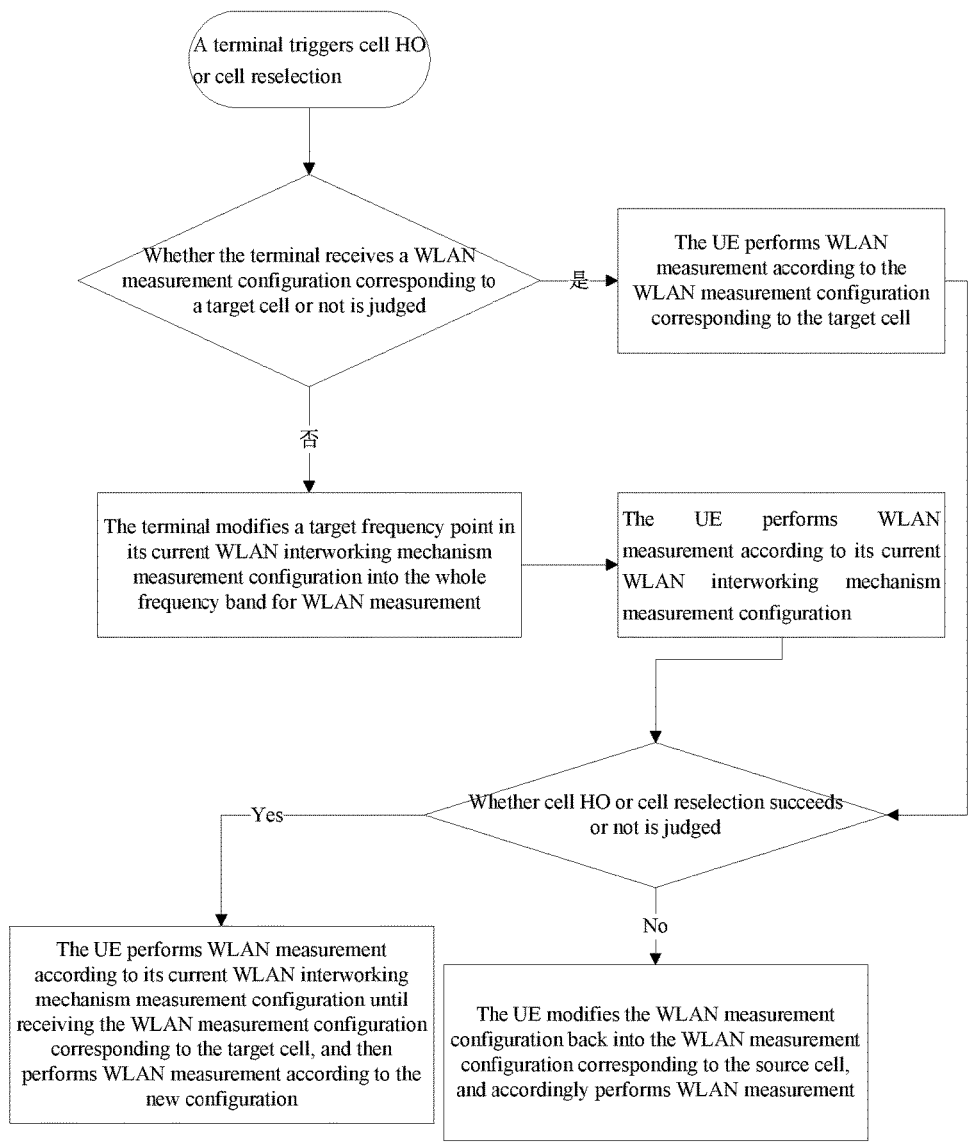
FIG. 4 is a flowchart of preferred embodiment 2 of the disclosure.

FIG. 4 is a flowchart of preferred embodiment 2 of the disclosure. As shown in FIG. 4, when UE triggers an HO flow or a reselection flow in the source cell, the terminal judges whether a WLAN measurement configuration corresponding to the target cell is received in the HO flow or the reselection flow or not; and if the WLAN measurement configuration is not received, the UE modifies a target frequency point in own current WLAN interworking mechanism measurement configuration into the whole frequency band, and performs WLAN measurement on such a basis. Such processing has the advantage that a WLAN measurement result of the UE is meaningless for a WLAN interworking decision in the target cell due to the fact that the target frequency point in the WLAN interworking mechanism measurement configuration of the source cell is greatly different from a target frequency point in the WLAN interworking mechanism measurement configuration of the target cell.

If the WLAN measurement configuration is received, the UE executes WLAN measurement according to the WLAN measurement configuration corresponding to the target cell.

When the HO flow or the reselection flow is ended, the UE executes different operation according to whether cell HO or cell reselection succeeds or not respectively.

If cell HO or cell reselection of the UE succeeds and the UE has yet not received the WLAN measurement configuration corresponding to the target cell, the UE continues executing WLAN measurement according to own current WLAN measurement configuration until receiving the WLAN measurement configuration corresponding to the target cell, and then the UE adopts the WLAN measurement configuration corresponding to the target cell. "Current" represents that the UE may have received the WLAN measurement configuration of the target cell, and may have yet not received the WLAN measurement configuration of the target cell.

If cell HO or cell reselection of the UE does not succeed, the UE modifies the WLAN measurement configuration back into the WLAN measurement configuration corresponding to the source cell, and performs WLAN measurement accordingly.

Preferably, the flow may also be modified into that the UE may modifies the target frequency point in own current WLAN interworking mechanism measurement configuration into the whole frequency band if the UE does not receive the WLAN measurement configuration corresponding to the target cell after implementing the cell HO or cell reselection process.

In the HO or reselection process, the WLAN measurement configuration corresponding to the target cell may be sent to the UE (the UE may be involved in the HO or reselection process, and may also not be involved in these processes at this time) by the ANDSF, and may also be sent to the UE by the target cell after the UE successfully implements the HO/reselection process.

Embodiment 3: Corresponding to c)

An application scenario of the embodiment includes an LTE system and a UMTS.

A source cell and a target cell may be eNBs of the LTE system or RNCs or Node Bs of the UMTS. The source cell and the target cell both support a WLAN interworking mechanism.

In the embodiment, when UE triggers an HO flow or a reselection flow in a source network, or after the UE implements HO/reselection, the UE actively requests the target cell (eNB/RNC) or an ANDSF for a WLAN measurement configuration corresponding to the target cell; and a requesting method may include at least one of manners as follows:

Manner 1: the UE appends the request in a 3GPP cell measurement report sent to the source cell; and the source cell sends the request to the target cell through an HO request message, the target cell may select to send the WLAN measurement configuration corresponding to the target cell to the source in an HO response message, and then the source cell sends the WLAN measurement configuration to the UE.

Manner 2: the UE initiates a connection with a network side in the target cell to send the request after implementing HO or reselection, and for example, the connection is established in the target cell, and the request is appended in an RRC connection establishment process, or the request is appended in uplink dedicated signalling; and the target cell may send the WLAN measurement configuration to the UE through downlink dedicated signalling.

Manner 3: the UE appends the request to send the request to the ANDSF in a TAU or RAU or LAU process; and the ANDSF sends the WLAN measurement configuration corresponding to the target cell to the UE through feedback signalling.

Manner 4: the UE appends the request to send the request to the source cell in the TAU or RAU or LAU process after implementing HO or reselection, and the target cell may send the WLAN measurement configuration to the UE through dedicated signalling, and a sending manner may adopt downlink dedicated signalling.

Preferably, the UE executes WLAN measurement according to the WLAN measurement configuration after receiving the requested WLAN measurement configuration corresponding to the target cell.

Embodiment 4: Corresponding to d)

An application scenario of the embodiment includes an LTE system and a UMTS.

A source cell and a target cell may be eNBs of the LTE system or RNCs or Node Bs of the UMTS. The source cell and the target cell both support a WLAN interworking mechanism.

In the embodiment, when UE triggers an HO flow or a reselection flow in a source network, the UE stops or delays WLAN measurement until the UE receives a WLAN measurement configuration corresponding to the target cell.

Or after the UE implements the HO flow or the reselection flow, the UE stops or delays WLAN measurement until the UE receives the WLAN measurement configuration corresponding to the target cell.

The embodiment has the advantages that: implementation complexity is low, and in addition, a risk of effective measurement of the UE because of a difference between a WLAN measurement configuration of the source cell and that of the target cell may be avoided.

Obviously, those skilled in the art should know that each component or step of the embodiment of the disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, or may form each integrated circuit component respectively, or multiple components or steps therein may form a single integrated circuit component for implementation. As a consequence, the disclosure is not limited to any specific hardware and software combination.

The above is only the preferred embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL APPLICABILITY

The technical solutions provided by the embodiment of the disclosure may be applied to the field of communication, the problem of how to process a measurement configuration during cell HO or cell reselection in the related technology is solved, and the measurement configuration for cell HO or reselection may be processed better.

What is claimed is:

1. A method for processing measurement configuration, comprising:

after triggering a HandOver (HO) flow or a reselection flow in a source cell, processing, by User Equipment (UE), a Wireless Local Area Network (WLAN) interworking mechanism measurement configuration in at least one of manners of:

continuing using, by the UE, a current WLAN interworking mechanism measurement configuration;

modifying, by the UE, a target frequency point in the current WLAN interworking mechanism measurement configuration into a whole frequency band for measurement;

requesting, by the UE, for a WLAN interworking mechanism measurement configuration corresponding to a target cell; and suspending, by the UE, WLAN interworking mechanism measurement until the UE receives the WLAN interworking mechanism measurement configuration corresponding to the target cell;

wherein requesting, by the UE, for the WLAN interworking mechanism measurement configuration corresponding to the target cell comprises at least one of:

containing, by the UE, a request in a cell measurement report sent to the source cell to request for the WLAN interworking mechanism measurement configuration corresponding to the target cell;

establishing, by the UE, a connection with the target cell to request for the WLAN interworking mechanism measurement configuration corresponding to the target cell after implementing the HO flow or the reselection flow;

requesting, by the UE, an Access Network Discovery Support Function (ANDSF) for the WLAN interworking mechanism measurement configuration corresponding to the target cell in a Tracking Area Update (TAU) or Route Area Update (RAU) or Location Area Update (LAU) process;

requesting, by the UE, the target cell for the WLAN interworking mechanism measurement configuration corresponding to the target cell in the TAU or RAU or LAU process after implementing the HO flow or the reselection flow.

2. The method according to claim 1, wherein the UE continues using the current WLAN interworking mechanism measurement configuration before receiving the WLAN interworking mechanism measurement configuration corresponding to the target cell.

3. The method according to claim 2, wherein the WLAN interworking mechanism measurement configuration corresponding to the target cell is sent by an Access Network Discovery Support Function (ANDSF), or is sent by the target cell.

4. The method according to claim 1, wherein modifying, by the UE, the target frequency point in the current WLAN interworking mechanism measurement configuration into the whole frequency band for measurement comprises:

based on that the UE does not receive the WLAN interworking mechanism measurement configuration corresponding to the target cell after the UE triggers the HO flow or the reselection flow in the source cell, modifying, by the UE, the target frequency point in the current WLAN interworking mechanism measurement configuration into the whole frequency band for measurement; or, based on that the UE does not receive the WLAN interworking mechanism measurement configuration corresponding to the target cell after the UE implements the HO flow or the reselection flow, modifying, by the UE, the target frequency point in the current WLAN interworking mechanism measurement configuration into the whole frequency band for measurement.

5. The method according to claim 1, after the UE contains the request in the cell measurement report sent to the source cell to request for the WLAN interworking mechanism measurement configuration corresponding to the target cell, the method further comprising:

sending, by the source cell, the request to the target cell through an HO request message after receiving the request;

receiving, by the source cell, the WLAN interworking mechanism measurement configuration corresponding to the target cell from the target cell; and sending, by the source cell, the WLAN interworking mechanism measurement configuration corresponding to the target cell to the UE.

6. The method according to claim 5, wherein the source cell receives the WLAN interworking mechanism measurement configuration corresponding to the target cell from the target cell through an HO response message.

7. The method according to claim 1, after the UE establishes the connection with the target cell to request for the WLAN interworking mechanism measurement configuration corresponding to the target cell after implementing the HO flow or the reselection flow, the method further comprising:

sending, by the target cell, the WLAN interworking mechanism measurement configuration corresponding to the target cell to the UE after receiving the request;

wherein the UE establishes the connection with the target cell to request for the WLAN interworking mechanism measurement configuration corresponding to the target cell after implementing the HO flow or the reselection flow comprises: establishing, by the UE, the connection with the target cell, and appending the request in a Radio Resource Control (RRC) connection establishment process, or appending the request in uplink dedicated signalling; and/or the ANDSF or the target cell sends the WLAN interworking mechanism measurement configuration corresponding to the target cell to the UE through downlink dedicated signalling.

8. The method according to claim 1, wherein suspending, by the UE, WLAN interworking mechanism measurement until the UE receives the WLAN interworking mechanism measurement configuration corresponding to the target cell comprises:

suspending, by the UE, WLAN interworking mechanism measurement until the UE receives the WLAN interworking mechanism measurement configuration corresponding to the target cell after the UE triggers the HO flow or the reselection flow in the source cell; or, suspending, by the UE, WLAN interworking mechanism measurement until the UE receives the WLAN interworking mechanism measurement configuration corresponding to the target cell after the UE implements the HO flow or the reselection flow.

9. The method according to claim 4, further comprising:

caching, by the UE, the WLAN interworking mechanism measurement configuration corresponding to the source cell, and modifying, by the UE, the WLAN measurement configuration into the WLAN measurement configuration corresponding to the source cell under the condition that the UE re-establishes a connection with the source cell or is reselected to the source cell based on the HO flow or the reselection flow fails.

10. The method according to claim 1, after the HO flow or the reselection flow is triggered in the source cell and before the UE receives the WLAN measurement configuration corresponding to the target cell, under the condition that the UE triggers a WLAN interworking mechanism measurement report, the method further comprising at least one of the followings:
  deleting, by the UE, the WLAN interworking mechanism measurement report; and
  sending, by the UE, the WLAN interworking mechanism measurement report to the target cell;
  wherein
  deleting, by the UE, the WLAN interworking mechanism measurement report comprises: deleting, by the UE, the WLAN interworking mechanism measurement report under the condition that the target cell does not support a WLAN interworking mechanism; and/or
  sending, by the UE, the WLAN interworking mechanism measurement report to the target cell comprises: sending, by the UE, the WLAN interworking mechanism measurement report to the source cell under the condition that the source cell has yet not sent an HO request to the target cell, and sending, by the source cell, the WLAN interworking mechanism measurement report to the target cell through the HO request message; and establishing, by the UE, the connection with the target cell to send the WLAN interworking mechanism measurement report which is cached before after HO or reselection of the UE to the target cell.

11. The method according to claim 10, after sending the WLAN interworking mechanism measurement report to the target cell, the method further comprising:
  making, by the target cell, a WLAN interworking decision for the UE according to the received WLAN interworking mechanism measurement report;
  sending, by the target cell, a decision command corresponding to the decision to the source cell through signalling interaction of an HO process, and sending, by the source cell, the decision command to the UE; or,
  sending, by the target cell, the decision command to the UE through the connection established with the UE.

12. A device for processing measurement configuration, located in User Equipment (UE), which comprises a hardware processor and a memory, wherein the hardware processor is configured to execute program component stored in the memory, and the program component comprises:
  a measurement configuration processing component, wherein
  the measurement configuration processing component is configured to, after triggering a HandOver (HO) flow or a reselection flow in a source cell, process a Wireless Local Area Network (WLAN) interworking mechanism measurement configuration in at least one of manners of:
  continuing using a current WLAN interworking mechanism measurement configuration;
  modifying a target frequency point in the current WLAN interworking mechanism measurement configuration into a whole frequency band for measurement;
  requesting for a WLAN interworking mechanism measurement configuration corresponding to a target cell; and
  suspending WLAN interworking mechanism measurement until the UE receives the WLAN interworking mechanism measurement configuration corresponding to the target cell;
  wherein requesting, for the WLAN interworking mechanism measurement configuration corresponding to the target cell comprises at least one of:
  containing, a request in a cell measurement report sent to the source cell to request for the WLAN interworking mechanism measurement configuration corresponding to the target cell;
  establishing, a connection with the target cell to request for the WLAN interworking mechanism measurement configuration corresponding to the target cell after implementing the HO flow or the reselection flow;
  requesting, an Access Network Discovery Support Function (ANDSF) for the WLAN interworking mechanism measurement configuration corresponding to the target cell in a Tracking Area Update (TAU) or Route Area Update (RAU) or Location Area Update (LAU) process;
  requesting, the target cell for the WLAN interworking mechanism measurement configuration corresponding to the target cell in the TAU or RAU or LAU process after implementing the HO flow or the reselection flow.

13. A method for processing measurement configuration, applied in equipment on a network side, comprising:
  receiving a request sent by User Equipment (UE), wherein the request is used for requesting for a Wireless Local Area Network (WLAN) interworking mechanism measurement configuration corresponding to a target cell, and the target cell is a target cell of a HandOver (HO) flow or reselection flow triggered by the UE; and
  sending the WLAN interworking mechanism measurement configuration corresponding to the target cell to the UE;
  wherein receiving the request sent by the UE comprises at least one of the following steps:
  receiving, by a source cell, a cell measurement report sent by the UE, wherein the cell measurement report contains the request;
  receiving, by the target cell, the request through a connection established with the UE after the UE implements the HO flow or the reselection flow;
  receiving, by an Access Network Discovery Support Function (ANDSF), the request in a Tracking Area Update (TAU) or Route Area Update (RAU) or Location Area Update (LAU) process; and
  receiving, by the target cell, the request in the TAU or RAU or LAU process after the UE implements the HO flow or the reselection flow.

14. The method according to claim 13,
  wherein after receiving, by the ANDSF or the target cell, the request in the TAU or RAU or LAU process, the method further comprising: sending, by the ANDSF or the target cell, the WLAN interworking mechanism measurement configuration corresponding to the target cell to the UE; and/or
  after the target cell receives the request through the connection established with the UE, the method further comprising: sending, by the target cell, the WLAN interworking mechanism measurement configuration corresponding to the target cell to the UE.

15. The method according to claim 13, after receiving, by the source cell, the cell measurement report sent by the UE, further comprising:

sending, by the source cell, the request to the target cell through an HO request message;

receiving, by the source cell, the WLAN interworking mechanism measurement configuration corresponding to the target cell from the target cell; and sending, by the source cell, the WLAN interworking mechanism measurement configuration corresponding to the target cell to the UE;

wherein the source cell receives the WLAN interworking mechanism measurement configuration corresponding to the target cell from the target cell through an HO response message.

16. The method according to claim 13, further comprising:

receiving, by the target cell, a WLAN interworking mechanism measurement report sent by the UE, wherein sending of the WLAN interworking mechanism measurement report is triggered by the UE after the HO flow or the reselection flow is triggered in the source cell and before the UE receives the WLAN measurement configuration corresponding to the target cell.

17. The method according to claim 16, wherein receiving, by the target cell, the WLAN interworking mechanism measurement report sent by the UE comprises at least one of the followings:

receiving, by the target cell, the HO request message sent by the source cell, wherein the HO request message contains the WLAN interworking mechanism measurement report, and the WLAN interworking mechanism measurement report of the source cell is received from the UE; and receiving, by the target cell, the WLAN interworking mechanism measurement report which is cached by the UE before through the connection established with the UE after HO or reselection of the UE to the target cell.

18. The method according to claim 16, after the target cell receives the WLAN interworking mechanism measurement report sent by the UE, the method further comprising:

making, by the target cell, a WLAN interworking decision for the UE according to the received WLAN interworking mechanism measurement report;

sending, by the target cell, a decision command corresponding to the decision to the source cell through signalling interaction of an HO process, and sending, by the source cell, the decision command to the UE; or, sending, by the target cell, the decision command to the UE through the connection established with the UE.

19. A device for processing measurement configuration, located in equipment on a network side, which comprises a hardware processor and a memory, wherein the hardware processor is configured to execute program components stored in the memory, and the program components comprise:

a receiving component configured to receive a request sent by User Equipment (UE), wherein the request is used for requesting for a Wireless Local Area Network (WLAN) interworking mechanism measurement configuration corresponding to a target cell, and the target cell is a target cell of a HandOver (HO) flow or reselection flow triggered by the UE; and a sending component configured to send the WLAN interworking mechanism measurement configuration corresponding to the target cell to the UE;

wherein the receiving component is configured to receive the request sent by the UE by at least one of the following steps:

receiving, by the receiving component of a source cell which the device comprises, a cell measurement report sent by the UE, wherein the cell measurement report contains the request;

receiving, by the receiving component of the target cell which the device comprises, the request through a connection established with the UE after the UE implements the HO flow or the reselection flow;

receiving, by the receiving component of an Access Network Discovery Support Function (ANDSF) which the device comprises, the request in a Tracking Area Update (TAU) or Route Area Update (RAU) or Location Area Update (LAU) process; and receiving, by the receiving component of the target cell which the device comprises, the request in the TAU or RAU or LAU process after the UE implements the HO flow or the reselection flow.

* * * * *